Dr. J. Kidder's Galvanic Batteries.

No. 116451. Patented Jun 27 1871.

Witnesses: Chas. Nida, Gustave Dieterich

Inventor: Jerome Kidder
Per Munn & Co. Attorneys.

UNITED STATES PATENT OFFICE.

JEROME KIDDER, OF NEW YORK, N. Y.

IMPROVEMENT IN GALVANIC BATTERIES.

Specification forming part of Letters Patent No. 116,451, dated June 27, 1871.

*To all whom it may concern:*

Be it known that I, JEROME KIDDER, of New York city, in the county and State of New York, have invented a new and Improved Galvanic Battery; and I do hereby declare that the following is a full, clear, and exact description thereof, which will enable others skilled in the art to make and use the same, reference being had to the accompanying drawing forming part of this specification.

My invention consists in a new and improved arrangement of batteries to facilitate the changes required for combining them, either for quantity or for intensity. This arrangement consists in attaching the batteries in rows to a support or supporters, the negative of each battery being connected with the positive of the next battery throughout each row, and the positives of all the batteries being substantially in one direction and the negatives in the other direction, with facilities both to connect and also to have unconnected the negative of one row with the positive of the next row, and throughout the series of rows; also with facilities to connect and have unconnected the rows of elements or positives with the positives of two or more of the rows, in such a manner as to vary at option the ratio of the quantity and intensity of the batteries.

Figure 1:
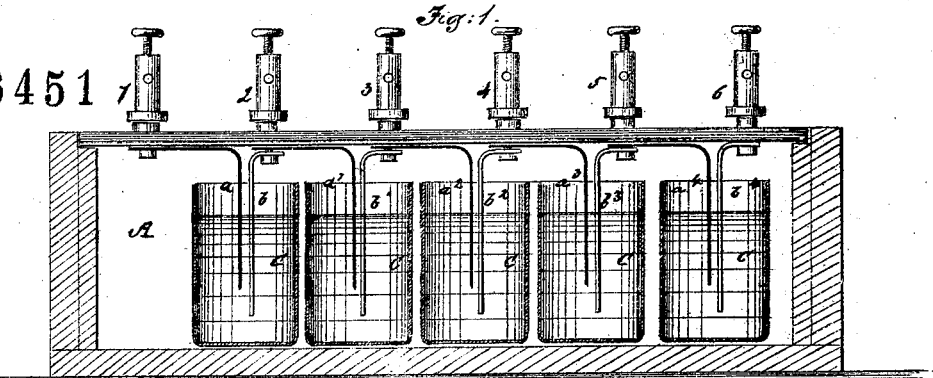
Figure 2:
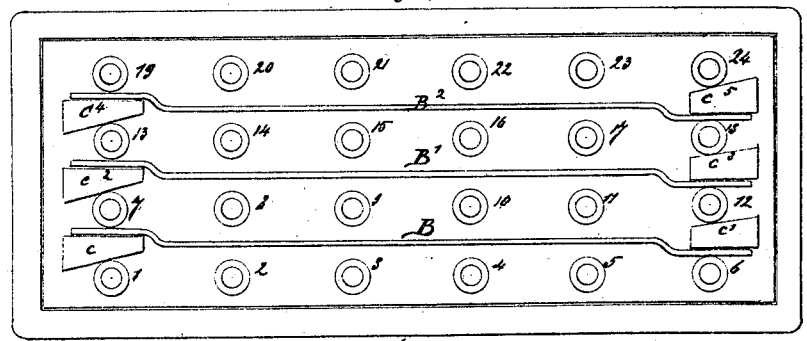
Figure 3:
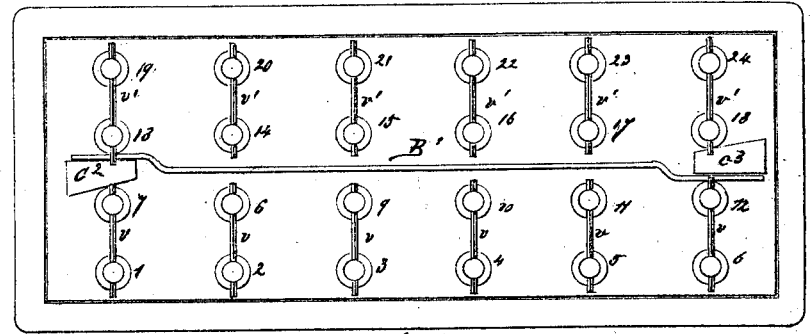
Figure 4:
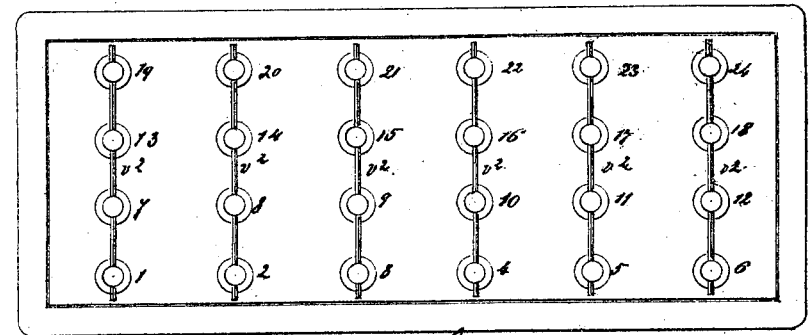

In the sectional elevation, Figure 1, $a$ $a^1$ $a^2$ $a^3$ $a^4$ $a^5$ represent the negative elements, as platina, copper, carbon, &c., constituting positive poles of a series of batteries in a row. $b$ $b^1$ $b^2$ $b^3$ $b^4$ represent the positive elements, as zinc, constituting the negative poles of the same series of batteries in a row. 1, 2, 3, 4, 5, and 6 are metallic posts, with screw-cup bolted to the elements of the battery. A represents the cups for holding the liquid. In the plan view, Fig. 2, 1 2 3 4 5 6 7 8 9 10 11 12 13 14 15 16 17 18 19 20 21 22 23 24 are rows of metallic posts, having screw-cups bolted to the several elements in each row, as described in Fig. 1. B B$^1$ B$^2$ are metallic strips. C C$^1$ C$^2$ C$^3$ C$^4$ C$^5$ are pieces of cork. Fig. 3, V V V V V V V' V' V' V' V' V' are metallic strips or wires, each connecting two rows of posts with screw-cups. Fig. 4, V'' V'' V'' V'' V'' V'' are metallic strips or wires, each connecting four rows of posts with screw-cups.

$a$ $b$ constitute the elements of the first battery in the series; $a^1$ $b^1$ the elements of the second, $a^2$ $b^2$ the elements of the third, $a^3$ $b^3$ the elements of the fourth, $a^4$ $b^4$ the elements of the fifth battery, in the first row. The negative elements, but positive pole $a$, of the first battery is connected metallically to the screw-cup 1, and the positive element $b$, but negative pole, is connected metallically to the screw-cup 2, which is also connected metallically to the positive pole of the next battery, $a^1$; and the negative pole $b^1$, or this next battery, is connected with the screw-cup 3, and so on, the negative pole of one battery being connected with the screw-cup so as to represent also the positive pole of the next battery in the series. The first positive pole and the last negative pole in the row stand by themselves, to be connected at option with the unlike pole of an adjoining row. The poles of all the rows parallel to the first are connected in like manner, their positives being all in one direction and their negatives in the other.

To operate the battery for greatest intensity, I use the batteries as shown in Fig. 2, where the last pole 6 (negative) of the first row is connected by the metallic strip B to the positive 7 of the second row. The negative 12 of this second row is connected by the metallic strip B$^1$ to the positive 13 of the third row, and the negative 18 of the third row is connected to the positive 19 of the fourth row, the first pole 1 being the positive, and the last pole 24 being the negative, of the entire number of batteries thus operating for the highest intensity. In Fig. 3 I have represented one way to operate the battery for the quantity, in which the wires V V V V V V unite the poles of the first and second rows transversely in such a way that positives are connected with positives and negatives with negatives, thus virtually doubling the surface of the battery by uniting like poles. Also, the wires V' V' V' V' V' V' unite transversely the like poles of the third and fourth rows. And these doubled rows are connected—the negatives 6 and 12 of the first and second rows doubled by the metallic strip B$^1$ to the positive 13 and 19 of the third and fourth rows, doubled likewise; the positive pole of the doubled series being 1 and 7, and the negative being 18 and 24, giving double the quantity and half the intensity of the arrangement as in Fig. 2. Fig. 4 represents another plan for increasing quantity, in which all the rows are connected transversely by the wires V$^2$ V$^2$ V$^2$ V$^2$ V$^2$ V$^2$, the positives of each row being connected with the adjoining positives of the lateral row, and the negative with the negative, making virtually a series of five batteries, but each battery having four times the amount of surface of the elements as in the first arrangement, giving four times the quantity and only one-fourth the intensity of the first arrangement. The positive pole of this last combination is 1 7 13 19; the negative is 6 12 18 24, any one of these, or the wire connecting them.

I desire to disclaim any novelty in the idea of connecting galvanic batteries to produce either quantity or intensity currents, as this has been well known in electrical science for a long time.

Having thus described my invention, I claim as new and desire to secure by Letters Patent—

1. The combination of longitudinal bars B B¹ B² with the battery-cells and their connections, when arranged as and for the purpose specified.

2. The combination of transverse bars $v$ $v'$ $v''$ with the battery-cells and their connections, when arranged as and for the purpose specified.

3. The longitudinal bars B B' B'' and transverse bars $v$ $v'$ $v''$, combined and arranged with the battery-cells and connections, as and for the purpose specified.

JEROME KIDDER.

Witnesses:
 GEO. W. MABEE,
 ALEX. F. ROBERTS.